(12) United States Patent
Garza-Rodriguez et al.

(10) Patent No.: US 8,771,397 B2
(45) Date of Patent: Jul. 8, 2014

(54) STEELMAKING FACILITY COMPRISING A DIRECT REDUCTION PLANT AND AN ELECTRIC-ARC FURNACE

(75) Inventors: Gilberto Garza-Rodriguez, Nuevo Leon (MX); Andrea Tavano, Tavagnacco (IT); Octavio Jorge Becerra-Novoa, Monterrey (MX)

(73) Assignees: HYL Technologies, S.A. de C.V., San Nicolas de los Garza, Neuvo Leon (MX); Danieli & C. Officine Meccaniche, S.p.A., Buttrio (IT)

( * ) Notice: Subject to any disclaimer, the term of this patent is extended or adjusted under 35 U.S.C. 154(b) by 187 days.

(21) Appl. No.: 12/988,489

(22) PCT Filed: Apr. 17, 2008

(86) PCT No.: PCT/IB2008/000939
§ 371 (c)(1),
(2), (4) Date: Jan. 10, 2011

(87) PCT Pub. No.: WO2009/144521
PCT Pub. Date: Dec. 3, 2009

(65) Prior Publication Data
US 2011/0094337 A1 Apr. 28, 2011

(51) Int. Cl.
F27D 3/10 (2006.01)
F27B 17/00 (2006.01)
C21B 13/00 (2006.01)
F27B 19/00 (2006.01)

(52) U.S. Cl.
USPC ............... 75/10.66; 75/375; 75/507; 266/82; 266/142; 266/195

(58) Field of Classification Search
USPC ............ 75/507, 10.66, 375; 266/142, 195, 82
See application file for complete search history.

(56) References Cited

U.S. PATENT DOCUMENTS

| 5,296,015 A | 3/1994 | Becerra-Novoa et al. |
| 5,447,550 A | 9/1995 | Leal-Cantu et al. |
| 6,478,841 B1 | 11/2002 | Faccone et al. |

*Primary Examiner* — George Wyszomierski
*Assistant Examiner* — Tima M McGuthry Banks
(74) *Attorney, Agent, or Firm* — Frommer Lawrence & Haug LLP; A. Thomas S. Safford

(57) ABSTRACT

A steelmaking plant including a pressurized direct reduction reactor for continuous production of hot direct reduced iron with a batch-melting furnace and a standby cooler, all three being capable of being situated side-by-side, with such DRI being able to be alternatively fed to the furnace or to the cooler. The furnace is selectively charged through a diverter valve by a pneumatic transport system with the hot DRI being entrained in a carrier gas fed into a receiving bin (having an upper DRI/gas disengagement space and a lower DRI buffer portion). A pressurized charge of the DRI accumulated in such disengaging/buffer bin is periodically fed down into a dosing/depressurization bin which in turn depressurizes the DRI and feeds a batch of DRI down into the furnace. Upon sensing that the buffer portion is full, the DRI is then pneumatically diverted to the cooler, such as during furnace maintenance shut down.

22 Claims, 1 Drawing Sheet

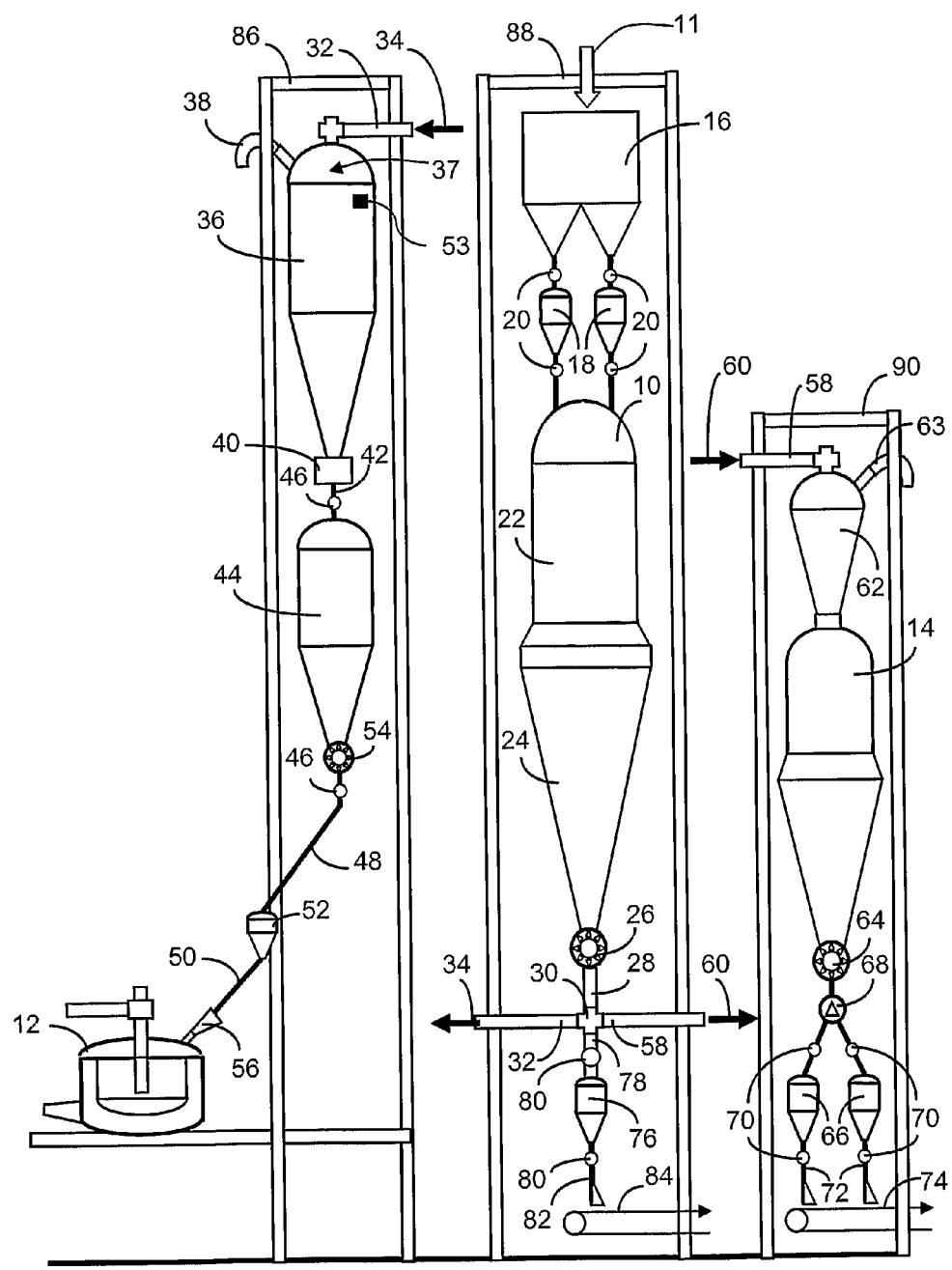

STEELMAKING FACILITY COMPRISING A DIRECT REDUCTION PLANT AND AN ELECTRIC-ARC FURNACE

This application is a 371 of PCT/IB2008/000939 filed on Apr. 17, 2008, published on Dec. 3, 2009 under publication number WO 2009/144521 A.

FIELD OF THE INVENTION

The invention relates to the field of integrated mini-mills having a direct reduction plant for producing direct reduced iron (DRI) which is then melted in electric arc furnaces (EAF) or similar devices for producing molten iron which is in turn used for the production of steel products. The invention allows for a lesser investment cost of the mini-mill and an advantageous coordination of and improved DRI flow between the continuous DRI production source and the batch-type melting furnace.

BACKGROUND OF THE INVENTION

Utilization of DRI in the steelmaking industry is expanding and the number of so-called mini-mills, which are steel plants of relatively small and medium production capacity, is increasing. These mini-mills comprise one or more direct reduction plants, wherein DRI is produced from iron ores, and electric arc furnaces (EAF) for melting said DRI and producing liquid iron and steel.

The economic and operational advantages of modern steelmaking mini-mills have been recognized in the prior art and some methods and apparatus have been proposed for rendering the mini-mills facilities more efficient with lower investment and operational costs.

See for example U.S. Pat. No. 6,478,841 to Faccone et al, which teaches a method of making steel in an integrated mini-mill wherein the DRI produced in a reduction reactor is transported at high temperatures to the EAF by means of an inclined rotary kiln. The DRI is discharged from the reduction reactor by a screw feeder and then is transported through the gravity-aided rotary kiln (which is pressurized with part of the top gas effluent from said reduction reactor in order to protect the hot DRI from re-oxidation). Faccone discloses the desirability of developing hot DRI handling systems capable of delivering hot DRI to the EAF with a minimum loss of metallization, i.e. the proportion of metallic iron content relative to the total iron content, which are easy to operate and having a low capital investment cost.

U.S. Pat. No. 5,296,015 to Becerra-Novoa et al (and assigned to an affiliated company of applicants' assignee) teaches a method of pneumatically transporting hot DRI produced in a direct reduction reactor capable of delivering such hot DRI with greater flexibility, especially to remote points of use. This patent generally discloses the method of pneumatically transporting hot DRI, but it is mute concerning the details of the system for charging DRI to the EAF and of the economic impact of minimizing the height, and therefore the cost, of the supporting structures of the DRI reactor, of the DRI charging bins and of a DRI cooler for discharging cold DRI for its safe handling, storage or transport at temperatures below about 100° C. This patent also does not teach or suggest any solution for the practical match of the continuous hot DRI production and the batch operation of the hot DRI melting furnace.

U.S. Pat. No. 5,445,363 also to Becerra-Novoa et al is a continuation-in-part of the foregoing U.S. Pat. No. 5,296,015 and adds a disclosure of a method and apparatus for producing iron and steel which addresses with some particularity the problem of minimizing the height of the reduction reactor supporting structure, such as when the hot DRI is used to produce briquettes of DRI. Becerra-Novoa et al here teach that the height of the support tower 142 (in FIG. 7) may be decreased by utilizing a pneumatic transport system for conveying the iron ore charged to and/or from the reduction reactor but does not address in any way the benefits that may be obtained by pneumatically transporting hot DRI, especially in an mini-mill plant having an electric-arc furnace where there are a number of operational and lay-out constraints and where there is the need of minimizing the operational and investment costs of the mini-mill plant.

The structure of the pneumatic transport system disclosed in the two Becerra-Novoa et al patents is elaborated upon with an added detail in a paper entitled "Super-Integration: Use of Hot DRI at New Hylsa CSP Mill", presented at the Nov. 20-22, 1996 Gorham/Intertech Mini-Mills of the Future Conference in Charlotte, N.C. This paper describes a proposed scale up of an existing pilot plant (that had been used to prove the concepts of the Becerra-Novoa et al patents). In comparing FIGS. 2 & 3 of the Becerra-Novoa et al patents with FIG. 2 of the paper, it will be seen that the patents show a carrier gas disengagement bin 54 together with a separate depressurizing lockhopper 130 (for feeding the EAF 48). In contrast, FIG. 2 of the paper shows a parallel pair of "EAF feeding bins"; where the disengagement & depressurizing functions are combined into each of such pair of bins, and the pair of such bins alternate with each other to give a continuous feed of DRI charge from the reduction reactor to the EAF (with one pressurized and filling with DRI, while the other is depressurized and discharging DRI to the EAF).

The structure of the paper's FIG. 2, as actually constructed in a mini-mill 1998, is shown diagrammatically on page 6 of the publication entitled HYL Report-The Direct Reduction Quarterly, Summer 2000, Vol. XIV, No. 2, published by HYL, Monterrey, Mexico. See the parallel bins feeding the "DC Furnace No. 1." Similarly, in the same mini-mill, the structure of the two Becerra-Novoa et al patents was also incorporated and expanded upon for commercial scale up. As illustrated and actually constructed, the upper three series of bins feeding the "DC Furnace No. 2" functioned respectively as 1) a simple disengagement bin 54, 2) a depressurizing bin 103, and 3) an atmospheric holding bin of sufficient capacity to have the charge to the EAF be 100% DRI. Note that each small bin immediately above each EAF is equivalent to bin 52 in appended FIG. 1 of this present application. Also note that the other two of the three parallel bins feeding "DC Furnace No. 2" are also atmospheric bins, two of which receive DRI from sources separately or indirectly from the reduction reactor (such as from the "external cooler"). This plant has been in operation now for a decade. This publication is currently available online at http://www.hylsamex.com/hyl/reportes/2000/summer.pdf.

U.S. Pat. No. 6,214,086 to Montague et al teaches a system using gravity to transport hot DRI material from a reduction reactor to an EAF and/or to a cooling vessel. This patent, at the bottom of column 1 and in the middle paragraphs of column 3, specifically teaches way from using pneumatic transport of the DRI, yet is a good demonstration of the limitations and drawbacks of a gravity feed system (limited travel distances and costly structural support of the large reactor 10 at great heights in order to be sufficiently above the EAF and the cooler, so as to achieve the necessary gravity feed angles thereto).

For further background, see U.S. Pat. No. 4,528,030 to Martinez-Vera et al, which shows a direct reduction plant which can be used in conjunction with the present invention.

DRI is a solid granular material which is produced by reaction of iron ores (mainly iron oxides) in solid phase with a reducing gas at a high temperature on the order of 900° C. to 1100° C. in a reduction reactor with or without a DRI cooling zone. DRI is then melted, preferably in an electric arc furnace, to produce molten iron and transformed into liquid steel. Direct reduction plants typically comprise a continuous moving bed reactor discharging hot or cold DRI. The term "cold DRI" is applied to DRI discharged at temperatures preferably below about 100° C., and the term "hot DRI" is applied to DRI discharged at temperature typically above about 400° C., e.g. to DRI not cooled down in the reduction reactor.

DRI, melted-down in electric arc furnaces, is usually mixed with scrap in selected proportions according to the economic cost of the charge materials and the attainable quality of the final steel products. The technology of design and operation of electric arc furnaces has evolved considerably. These melting furnaces utilize both electrical and chemical energy for decreasing the tap-to-tap time thus increasing the productivity of the furnace. In this respect, DRI containing a high proportion of combined carbon (above about 3% of $Fe_3C$) is significantly beneficial, because this carbon chemically combines with oxygen injected into the furnace producing heat and a foamy slag resulting also a number of other advantages.

Since hot DRI reacts with oxygen and moisture, if exposed at high temperatures to the ambient air, it is necessary to provide a shield of inert atmosphere while handling hot DRI until it reaches the EAF. There are several proposals in the industry for transferring hot DRI to a melting furnace. One in more recent use is by means of a pneumatic transport system utilizing an inert gas or a reducing gas as the carrier gas. Another way has been by means of moving the hot DRI on rails or by crane in individual refractory-lined closed transport vessels. Also, gravity feed has been traditionally used, but is severely constrained to short transport distances by the required angle of flow and by the expense of supporting the massive reactors at substantial heights to be above the structures being fed and especially to achieve such flow over any meaningful distance that might be needed to reach such structures.

The need exists for a method and apparatus for the design, construction and operation of an efficiently laid out mini-mill plant based on the respective needs of DRI production and of the DRI melting furnace (and not on the needs of the DRI transport system). The present invention provides such method and apparatus, while providing also a number of other advantages over the above-referenced prior-art systems.

Documents cited in this text (including the foregoing patents), and all documents cited or referenced in the documents cited in this text, are incorporated herein by reference. Documents incorporated by reference into this text or any teachings therein may be used in the practice of this invention.

OBJECTS OF THE INVENTION

It is therefore, an object of the invention to provide a mini-mill steelmaking plant with high efficiency and low operational and investment costs.

It is another object of the invention to provide a system and a method for efficiently melding the continuous operation of a reduction reactor producing hot DRI with the batch operation of an electric-arc furnace for melting said hot DRI.

It is a further object of the invention to provide flexibility in DRI plant design, not restricted by gravity flow limitations; and especially with improved continual free flow during pneumatic transport of DRI.

SUMMARY OF THE INVENTION

The objects of the invention are generally achieved by providing a steelmaking plant comprising: a direct reduction reactor for continuously producing hot DRI with a discharge at its lower end; a DRI melting furnace; a separate DRI cooler positioned aside from said reactor; a disengagement buffer bin located above the level of said melting furnace; a dosing depressurizing bin located in series between said disengagement buffer bin and said melting furnace and having a capacity to hold a charge of DRI of at least one heat size for said furnace; a pneumatic transport apparatus for conducting said hot DRI with a carrier gas from said reactor discharge to feed selectively, at a level above the level of said reactor discharge, either said furnace via said series of bins or said cooler; said disengagement buffer bin having in addition to a space in the upper portion thereof sufficient to disengage DRI from the carrier gas also has as its lower portion a buffering capacity to receive a continuing influx of DRI in sufficient excess of one heat size for said furnace to accommodate typical delays in the melting furnace; a first conduit means for conveying hot DRI from said reduction reactor to said disengagement buffer bin as part of the pneumatic transport apparatus; a second conduit means for conveying hot DRI from said disengagement buffer bin to said dosing depressurizing bin; a third conduit means for conveying hot DRI from said dosing depressurizing bin to said melting furnace; a fourth conduit means for conveying said hot DRI from said reduction reactor to said DRI cooler as part of the pneumatic transport apparatus; and a diverter valve for selectively directing a continuous flow of DRI from the reactor to one of at least said first or fourth conduits.

The objects of the invention are also generally achieved by providing method of making steel in a mini-mill plant comprising a direct reduction reactor for producing hot DRI; a DRI melting furnace; a DRI cooler; a disengagement buffer bin located above the level of said melting furnace; a dosing depressurizing bin located in series between said disengagement buffer bin and said melting furnace, said disengagement buffer bin having in addition to a space in the upper portion thereof sufficient to disengage DRI from a carrier gas also has as its lower portion a buffering capacity to receive a continuing influx of DRI in sufficient excess of one heat size for said furnace to accommodate typical delays in the melting furnace; and suitable conduits for transferring said hot DRI from said reduction reactor to said disengagement buffer bin and successively from said disengagement buffer bin to said dosing depressurizing bin and then to said melting furnace and/or for selectively conveying a portion of said hot DRI from said reduction reactor to said DRI cooler; which method comprises the steps of: producing hot DRI in said reduction reactor; selectively and continuously pneumatically conveying by means of a carrier gas said hot DRI to the disengagement buffer bin; determining the amount of hot DRI which will be charged to said melting furnace according to the next heat size; determining the level of DRI in said dosing depressurizing bin; conveying hot DRI from said disengagement buffer bin to said dosing depressurizing bin to at least match said amount to be charged to the melting furnace; thereafter isolating, depressurizing, dosing the contained DRI into the furnace, re-pressurizing, and reconnecting said dosing depressurizing bin to said disengagement buffer bin; continuing the cycle of foregoing steps except when conveying pneumatically the hot DRI from said reduction reactor by means of a carrier gas instead to said DRI cooler when the level of DRI in said disengagement buffer bin has reached its buffering capacity.

DETAILED DESCRIPTION OF THE INVENTION

FIG. 1 is a schematic frontal elevation of the DRI & steel production plant portion of a steel product producing mini-mill incorporating a preferred embodiment of the present invention illustrative of novel structure for delivery of DRI from the direct reduction reactor to subsequent processing structures such as an EAF and a cooling vessel.

DETAILED DESCRIPTION OF THE INVENTION

This invention as now described will be seen to be a novel and operatively effective improvement over the prior art in previously unappreciated ways, including over the superficially similar two alternative pneumatic DRI feed systems illustrated in the referenced diagram in the above cited HYL Report.

A preferred embodiment of the present invention is illustrated in appended FIG. 1; wherein said plant comprises a reduction reactor 10, an electric arc furnace 12 and a DRI cooling vessel 14. Iron ore 11 in the form of lumps, pellets or mixtures thereof is charged to charging bin 16, open to the atmosphere, which bin 16 alternately feeds a plurality of pressurizing bins 18 that in turn alternatively feed the iron ore particles in an overall continuous manner into the pressurized reduction reactor 10 (thus maintaining the pressure in the reactor system and also preventing the reducing gases from contacting the ambient air). For this purpose, the pressurizing bins 18 are provided with solid and gas sealing valves 20. Iron ore particles 11 flow downwardly by gravity through reduction reactor 10 where a high temperature reducing gas mainly composed of hydrogen and carbon monoxide reacts with iron oxides in the ore particles producing direct reduced iron (DRI) in the reduction zone 22 of said reactor. The reducing gas is introduced into the reactor 10 (via duct means, not shown for simplicity) at temperatures above about 850° C. More preferably, the temperature of the reducing gas is above 1000° C. with the consequent benefits in production rate increase, since the kinetics of the reduction reactions is enhanced.

The resulting hot DRI is then passed through the downwardly converging lower zone 24 of the reactor 10 and discharged via a rotary valve 26, or a similar solids regulating mechanism, which regulates the residence time of the ore in the reactor 10 and therefore the production rate of reactor 10.

The DRI 34 produced in reactor 10 passes through the discharge conduit 28 and then is selectively directed by diverter valve 30 to any of a plurality of pneumatic transport or diversion conduits 32, 58, or 78. During normal operation of the EAF; the diverter valve 30 is positioned to feed to a first conduit 32 forming part of a pneumatic transport system feeding to the EAF. First conduit 32 carries the hot DRI 34 to buffer bin 36.

The disengagement space 37 needed for separating the DRI particles from the carrier gas is integrated into the buffer bin 36 (instead of having a separate solids-disengagement bin). To this end, the buffer bin 36 is provided with an outlet 38 for the carrier gas used in the pneumatic transport through conduit 32. It is understood that the carrier gas is then recycled, reconditioned as needed, and recirculated in the pneumatic transport system in a manner known in the art, for example as described in U.S. Pat. No. 5,296,015 or in the aforementioned 1996 paper.

Hot DRI is normally continuously accumulated in the disengagement buffer bin 36 and is then periodically transferred through shut-off valve 40 and a second conduit 42 from time to time to a dosing/depressurizing bin 44 which holds said hot DRI for transfer at a regulated batch rate to the EAF 12. The dosing/depressurizing bin 44 is provided with gas seal valves 46 for maintaining the pressure of the pneumatic transport system in buffer bin 36 by means of inert gas pressurization and depressurization of bin 44 in a manner known in the art. When the hot DRI is fed to EAF 12, the dosing/depressurizing bin 44 is substantially at atmospheric pressure and the hot DRI flows to the EAF 12 by gravity through pipes 48 and 50 (which together constitute a third conduit). A supplementing bin 52 is optionally provided above the furnace so that other supplementary materials, such as fluxes and ferroalloys (not shown in the drawing for simplicity) may be added to the DRI 34 being fed to the EAF 12 via pipe 50. When charging hot DRI, said DRI 34 is typically at a temperature above about 500° C.

The advantages of the foregoing structure can best be appreciated by a comparison of the present invention to the two different prior pneumatic DRI feed systems (one feeding EAF No. 1 and the other feeding EAF No. 2), as illustrated in the referenced diagram in the above-cited HYL Report.

In the parallel bin arrangement shown in the HYL Report (as used to feed the EAF No. 1), when the first of the parallel bins is filled, then a valve in the pneumatic transporting pipe to that bin must be closed (and the continuing flow of DRI particles is diverted to fill the second parallel bin, while the first is depressurized and the DRI particles therein are discharged). This flow stoppage to the first bin interrupts the carrier gas flow to the first bin including the entrained DRI particles. The DRI particles in the closed off piping to the first bin thus fall and collect in the lower portion of such closed off transport piping.

When the first bin is ready to be recharged with a new load of DRI particles, the valve thereto is opened again, and the carrier gas must entrain the now inert DRI particles in the piping leading to the first bin. This stop/start flow of the relatively large DRI particles is a problem and is not energy efficient.

In the series-type two bin arrangement according to the present invention, there is no need for these carrier gas interruptions, since the upper (buffer) bin 36 is normally continually receiving the hot DRI 34. During the comparatively few exceptions when the capacity of bin 36 is reached, the DRI is merely re-directed to the cooler 14, without interruption in the pneumatic flow of DRI from the reactor 10. Even when there is such diversion (with a shut off of the supply of DRI 34 to the bin 36 by the diverter 30), there is no need to immediately shut off the carrier gas flow to bin 36 until after all the DRI particles 34 in the transporting pipe 32 at the time of shut off have been discharged into the bin 36. The transportation system incorporating the present invention thus has a smoother and more efficient operation.

Accordingly, the normal operation of the pneumatic transport arrangement according to the present invention is as follows:

The reactor 10 continuously produces hot DRI which is pneumatically transported to the upper (buffer) bin 36. All the while that the upper bin 36 is being continuously charged with DRI 34, the lower smaller bin 44 is isolated from bin 36, de-pressurized, emptied of the DRI 34 into the EAF 12, re-pressurized, and reconnected to bin 36 so as to be recharged with DRI 34 by gravity flow from the constantly pressurized upper buffer bin 36. The upper (buffer) bin 36 is preferably designed with an "extra" capacity for allowing accumulation of hot DRI when short delays occur in the operation of the EAF 12.

Another difference, between the prior art dual parallel bins and the present invention's dual series bins, is that the parallel bins either require a third bin (to function to disengage the carrier gas) or alternatively each parallel bin requires its own disengagement space. In contrast, in the series-bin arrangement according to the present invention, only the upper bin 36 has a disengagement space 37 (and no separate disengagement bin or other disengagement space in any other bin is needed).

This means, in addition, that the depressurizing bin 44 can be smaller than the upper bin 36 (as well as being smaller than either of the parallel bins alone, when such bins incorporate an integral disengagement space, or than the combination of such bins with a third bin when the latter is used to have separate disengagement).

Furthermore as a consequence of the series arrangement of the present invention, only two sets of isolating valves 40 are needed (since only bin 44 needs to be isolated for depressurization), while in contrast the parallel bin arrangement needs four sets (since each of the dual parallel bins needs to be alternately isolated).

The series bin arrangement shown in FIGS. 3 to 6 of the two Becerra-Novoa et al patents and in the diagram on page 6 of the HYL Report (as used to feed the EAF No. 2), are also different from the unique structure of the dual series bin arrangement according to the present invention. The Becerra-Novoa et al patents show a simple disengagement bin 54 followed by a simple depressurizing lockhopper 130. These patents were based on the results from tests in a small pilot plant operation where the issues of scale up for commercial use had not been addressed. There is no discussion nor any indicated appreciation of how to coordinate the continuous feed of the reactor to the batch feed of a melting furnace in general, nor to an EAF in particular. Such issues were considered in the scaled up commercial plant illustrated in the referenced diagram of the HYL Report. However, there it can be seen that the simplified bin combination of the Becerra-Novoa et al patents was retained and thereto was added a third atmospheric accumulating bin in line below the other two bins. This combination does not have the advantages discussed above regarding the present invention, nor is there any suggestion of the compact structure which particularly lends itself to use in a minimill.

Continuing with the description of this embodiment, the dosing/depressurizing bin 44 is provided with a discharge regulation means 54, for example a rotary valve or a similar mechanism which may be used for regulating the flow rate of the DRI. In this way, the amount and rate and timing of hot DRI is regulated according to the batch feed production schedule of the EAF.

The DRI buffer bin 36 and dosing/depressurizing bin 44 positioned in series vertically above the EAF can not be located directly over the EAF, because of the space required for displacing the furnace roof for scrap charging as well as the need for keeping sufficient space above the furnace for the overhead crane maneuvers for scrap charging and maintenance. The EAF 12 is thus fed by an angled conduit 50 which engages with connecting device 56 attached to EAF 12. When EAF 12 is tilted for steel tapping or for other maneuvers, the flow of DRI in 34 in conduits 48 & 50 is interrupted and conduit 50 is disengaged from connecting device 56.

If the EAF 12 is shut down or has significant delays, dosing bin 44 may remain filled with hot DRI as well as the buffer bin 36. Since reduction reactor 10 continues operating, the hot DRI is diverted by diverting valve 30 to pneumatic transport conduit 58 which leads said hot DRI 60 to DRI cooler 14. This diversion from feeding the EAF 12 to feeding the cooler 14 preferably is triggered by a sensor 53 in bin 36 that upon determining that the buffering capacity of the lower portion of the disengagement buffer bin 36 is full with DRI (below the disengagement space 37) controls the diverter valve 30 to switch the DRI flow over to feed the cooler 14.

Cooling down the DRI 60 to temperatures below about 100° C. (to prevent reoxidation) permits discharge of the sufficiently cooled DRI to closed or open areas for storage and later utilization. Pneumatic transport conduit 58 may extend to significantly increased distances for much greater flexibility as required by the lay-out of the steelmaking plant. In a preferred embodiment of the invention, for maximum efficiency, the DRI cooler 14 is located closely next to, but not below, the reduction reactor 10.

This fourth conduit 58 delivers hot DRI 60 to a cooler disengagement bin 62 provided with carrier-gas outlet 63 similar to outlet 38 of the EAF buffer bin 36. Hot DRI 60 is then cooled down by counter-current circulation of a cooling gas through said DRI 60 in the cooler 14. The residence time of the DRI in the cooler is regulated by rotary valve 64. The cooled DRI 60 is discharged from said cooler through pressure-lock bins 66. Diverter valve 68 directs cooled DRI alternatively to any of the discharging bins 66, which by means of valves 70 are in communication during charging with cooler 14 or during discharging with the ambient atmosphere. The cooled DRI is delivered through discharging pipes 72 and carried away for storage or other uses, for example, by conveyor 74.

The reduction reactor 10 is provided with a direct discharging and depressurizing bin 76 for those cases when it has to be discharged without passing the DRI through either the EAF 12 or the DRI cooler 14. For example, this can be used to unload the reactor 22 during maintenance or mini-mill shut down. To this end, diverter valve 30 may direct the DRI through a diversion fifth conduit 78 to the de-pressurizing discharge bin 76, and then, after appropriate manipulation of the gas seals 80 to effect the depressurization, the DRI 60 is delivered to conveyor 84 through discharge pipe 82.

According to one aspect of the invention, at least three separate supporting structures are designed and set-up for a mini-mill plant based on DRI and electric furnaces, not counting the supporting structures of the melt-shop and other facilities for steelmaking. One supporting structure 86 is for the buffer bin 36 and dosing bin 44, another structure 88 is for the reduction reactor 10, and another structure 90 is for the DRI cooler 14.

The height of these supporting structures can be minimized and laid-out in the plant as it may best fit the local constraints while also minimizing the plant cost. The flexibility provided by the use of pneumatic transport of hot DRI from the reduction reactor 10 to the EAF supply bins 36 & 44 and to the DRI cooler 14 allows for also minimizing the height of said structures. The economic importance of this advantage is more significant as the production capacity of the reduction reactor and the furnace increases (since more weight is to be supported at higher heights, if the hot DRI is transported only by gravity).

In a preferred embodiment of the invention structure 86 is located as close as possible to EAF 12, and structure 90 for the DRI cooler is located as close as possible to reduction reactor 10.

It is of course to be understood that the above description is for illustrative purposes setting forth some preferred embodiments of the invention and that numerous modifications and additions may be made to those embodiments without departing from the spirit and scope of the invention.

What is claimed is:

1. A steelmaking plant comprising:
   a direct reduction reactor for continuously producing hot direct reduced iron, DRI, with a discharge at its lower end;
   a DRI melting furnace;
   a separate DRI cooler positioned aside from said reactor;
   a pressurized disengagement buffer bin located above said melting furnace;
   a dosing depressurizing bin located in series between said disengagement buffer bin and said melting furnace and having a capacity to hold a charge of DRI of at least one heat size for said furnace;
   a pneumatic transport apparatus for conducting said hot DRI with a carrier gas from said reactor discharge to feed selectively, at a level above the discharge of said reactor, either said furnace via said bins or said cooler;
   said disengagement buffer bin having an upper portion, with space sufficient to disengage DRI from the carrier gas, and also having as its lower portion a buffering capacity to receive a continuing influx of DRI in sufficient excess of one heat size for said furnace to accommodate delays in the melting furnace until the buffering capacity is full;
   a first conduit means for conveying hot DRI from said reduction reactor to said disengagement buffer bin as part of the pneumatic transport apparatus;
   a second conduit means for conveying hot DRI from said disengagement buffer bin to said dosing depressurizing bin;
   a third conduit means for conveying hot DRI from said dosing depressurizing bin to said melting furnace;
   a fourth conduit means for conveying said hot DRI from said reduction reactor to said DRI cooler as part of the pneumatic transport apparatus; and
   a diverter valve for selectively directing a continuous flow of DRI from the reactor to one at least said first or fourth conduits.

2. A steelmaking plant according to claim 1, wherein said melting furnace is an electric-arc furnace.

3. A steelmaking plant according to claim 2, further comprising a sensor for determining that the DRI has filled the buffering capacity of said lower portion of disengagement buffer bin and for controlling the diverter valve to switch the DRI flow over to feed the cooler.

4. A steelmaking plant according to claim 3, wherein said dosing depressurizing bin is subject to an ambient atmosphere; and further comprising gas sealing valves for isolating said dosing depressurizing bin from the ambient atmosphere and for maintaining the pressure of the pneumatic transport apparatus in said disengagement buffer bin.

5. A steelmaking plant according to claim 4, wherein said series of bins are aligned such that hot DRI flows by gravity through said second and third conduit means.

6. A steelmaking plant according to claim 5 wherein said DRI cooler includes a disengagement bin.

7. A steelmaking plant according to claim 6, further comprising at least one pressure-lock bin and gas sealing valves at the inlet and outlet of said pressure-lock bin for isolating said pressure-lock bin from the ambient atmosphere and for discharging cooled DRI from said DRI cooler.

8. A steelmaking plant according to claim 7, wherein said disengagement buffer bin has a capacity of at least about 1.3 times the heat size of said melting furnace.

9. A steelmaking plant according to claim 8, wherein said disengagement buffer bin has a capacity of at least about 1.8 times the heat size of said melting furnace.

10. A steelmaking plant according to claim 1, wherein said direct reduction reactor is pressurized.

11. A steelmaking plant according to claim 10, wherein said melting furnace is an electric-arc furnace.

12. A steelmaking plant according to claim 11,
    further comprising a sensor for determining that the DRI has filled the buffering capacity of said lower portion of disengagement buffer bin and for controlling the diverter valve to switch the DRI flow over to feed the cooler;
    wherein said dosing depressurizing bin is subject to an ambient atmosphere; and further comprising gas sealing valves for isolating said dosing depressurizing bin from the ambient atmosphere;
    wherein said series of bins are aligned such that hot DRI flows by gravity through said second and third conduit means;
    wherein said DRI cooler includes a disengagement bin; and
    further comprising at least one pressure-lock bin and gas sealing valves at the inlet and outlet of said pressure-lock bin for isolating said pressure-lock bin from the ambient atmosphere and for discharging cooled DRI from said DRI cooler.

13. A steelmaking plant according to claim 12, wherein said disengagement buffer bin has a capacity of at least about 1.3 times the heat size of said melting furnace.

14. A steelmaking plant according to claim 13, wherein said disengagement buffer bin has a capacity of at least about 1.8 times the heat size of said melting furnace.

15. A steelmaking plant according to claim 1, further comprising a direct discharging and depressurizing bin and a diversion fifth conduit means for selectively conveying, via said diverter valve, DRI from said reduction reactor to said direct discharging and depressurizing bin.

16. A method of making steel in a mini-mill plant comprising
    a direct reduction reactor for producing hot direct reduced iron, DRI;
    a DRI melting furnace;
    a DRI cooler;
    a pressurized disengagement buffer bin located above said melting furnace;
    a dosing depressurizing bin located in series between said disengagement buffer bin and said melting furnace,
    said disengagement buffer bin having an upper portion, with space sufficient to disengage DRI from the carrier gas, and also having as its lower portion a buffering capacity to receive a continuing influx of DRI in sufficient excess of one heat size for said furnace to accommodate delays in the melting furnace until the buffering capacity is full;
    a diverter valve; and
    suitable conduits for transferring said hot DRI from said reduction reactor to said disengagement buffer bin and successively from said disengagement buffer bin to said dosing depressurizing bin and then to said melting furnace and/or for selectively conveying a portion of said hot DRI from said reduction reactor to said DRI cooler;
    which method comprises the steps of:
    1. producing hot DRI in said reduction reactor;

2. selectively and continuously pneumatically conveying by means of a carrier gas said hot DRI to the disengagement buffer bin;
3. determining the amount of hot DRI which will be charged to said melting furnace according to the heat size;
4. determining at what level the DRI is in said dosing depressurizing bin;
5. conveying hot DRI from said disengagement buffer bin to said dosing depressurizing bin to at least match said amount to be charged to the melting furnace;
6. thereafter isolating said dosing depressurizing bin from said disengagement buffer bin:
7. depressurizing said dosing depressurizing bin and dosing the DRI now isolated in the dosing depressurizing bin into the furnace by said amount to be charged;
8. thereafter re-pressurizing and reconnecting said dosing depressurizing bin to said disengagement buffer bin;

continuing the cycle of foregoing steps 1-8; except that upon determining that the level of DRI in said disengagement buffer bin has reached its buffering capacity then the pneumatic conveying by means of a carrier gas of said hot DRI is diverted to the cooler.

17. A method according to claim 16, wherein said dosing from said dosing depressurizing bin is into an electric arc steel making furnace, and wherein said disengagement buffer bin has a capacity of at least about 1.3 times the heat size of said melting furnace.

18. A method according to claim 17, further comprising sensing when DRI has filled the buffering capacity of said lower portion of disengagement buffer bin and then controlling the diverter valve to switch the carrier gas conveying the hot DRI over to feed the cooler.

19. A method according to claim 16, wherein said direct reduction reactor is pressurized.

20. A method according to claim 19, wherein said dosing from said dosing depressurizing bin is into an electric arc steel making furnace, and wherein said disengagement buffer bin has a capacity of at least about 1.3 times the heat size of said melting furnace.

21. A method according to claim 20, further comprising sensing when DRI has filled the buffering capacity of said lower portion of disengagement buffer bin and then controlling the diverter valve to switch the carrier gas conveying the hot DRI over to feed the cooler.

22. A method according to claim 16, wherein said mini-mill plant further comprises
a pneumatic transport apparatus for conducting said hot DRI with said carrier gas from said reactor to feed selectively, at a level above the discharge from said reactor, either said furnace via said bins or said cooler; and
maintaining, in said disengagement buffer bin, pressure from the pneumatic transport apparatus.

* * * * *